(12) United States Patent
Attaluri et al.

(10) Patent No.: US 9,292,560 B2
(45) Date of Patent: *Mar. 22, 2016

(54) REDUCING COLLISIONS WITHIN A HASH TABLE

(71) Applicant: International Business Machines Corporation, Armonk, NY (US)

(72) Inventors: Gopi K. Attaluri, San Jose, CA (US); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/471,272

(22) Filed: Aug. 28, 2014

(65) Prior Publication Data

US 2014/0372392 A1 Dec. 18, 2014

Related U.S. Application Data

(63) Continuation of application No. 13/753,769, filed on Jan. 30, 2013.

(51) Int. Cl.
*G06F 7/00* (2006.01)
*G06F 17/30* (2006.01)

(52) U.S. Cl.
CPC ...... *G06F 17/30339* (2013.01); *G06F 17/3033* (2013.01)

(58) Field of Classification Search
CPC .................. G06F 17/3033; G06F 17/30097
USPC ....................................................... 707/695
See application file for complete search history.

(56) References Cited

U.S. PATENT DOCUMENTS

| | | | |
|---|---|---|---|
| 5,598,559 A | 1/1997 | Chaudhuri | |
| 5,893,086 A | 4/1999 | Schmuck et al. | |
| 5,930,785 A | 7/1999 | Lohman et al. | |
| 6,026,394 A | 2/2000 | Tsuchida et al. | |
| 6,052,697 A * | 4/2000 | Bennett | G06F 12/0864 707/999.1 |
| 6,292,795 B1 | 9/2001 | Peters et al. | |
| 6,505,189 B1 | 1/2003 | On Au et al. | |
| 6,609,131 B1 | 8/2003 | Zait et al. | |
| 6,757,677 B2 | 6/2004 | Pham et al. | |
| 6,775,681 B1 | 8/2004 | Ballamkonda et al. | |
| 6,941,432 B2 | 9/2005 | Ronstrom | |
| 6,954,776 B1 | 10/2005 | Cruanes et al. | |
| 7,062,481 B2 | 6/2006 | Pham et al. | |
| 7,287,131 B1 | 10/2007 | Martin et al. | |
| 7,293,028 B2 | 11/2007 | Cha et al. | |
| 7,308,539 B2 | 12/2007 | Fuhs et al. | |

(Continued)

OTHER PUBLICATIONS

Cleary, John, G., "Compact Hash Tables Using Bidirectional Linear Probing", IEEE Transactions on Computers, vol. C-33, No. 9, Sep. 1994, pp. 824-834.

(Continued)

*Primary Examiner* — Cheyne D Ly
(74) *Attorney, Agent, or Firm* — Mohammed Kashef; Edell, Shapiro & Finnan, LLC

(57) ABSTRACT

Collisions in hash tables are reduced by removing each empty bucket from a hash table and compacting the non-empty buckets, generating a map of the hash table indicating a status of the buckets of the hash table, and accessing data in the hash table by applying a hash key to the generated map to determine a corresponding bucket containing the data.

20 Claims, 9 Drawing Sheets

(56) References Cited

U.S. PATENT DOCUMENTS

| | | |
|---|---|---|
| 7,343,363 B1 | 3/2008 | Parker |
| 7,499,960 B2 | 3/2009 | Dageville et al. |
| 7,653,670 B2 | 1/2010 | Hasan et al. |
| 7,827,182 B1 | 11/2010 | Panigrahy |
| 7,827,218 B1 | 11/2010 | Mittal |
| 8,145,642 B2 | 3/2012 | Cruanes et al. |
| 8,195,644 B2 | 6/2012 | Xu |
| 8,271,564 B2 | 9/2012 | Dade |
| 8,321,385 B2 | 11/2012 | Burroughs et al. |
| 8,370,316 B2 | 2/2013 | Bensberg et al. |
| 8,438,574 B1 | 5/2013 | Lyle et al. |
| 8,443,155 B2 | 5/2013 | Adams et al. |
| 8,661,005 B2 | 2/2014 | McKenney et al. |
| 8,768,889 B1 | 7/2014 | Martin |
| 8,768,927 B2 | 7/2014 | Yoon et al. |
| 2002/0016820 A1 | 2/2002 | Du Val et al. |
| 2004/0260684 A1 | 12/2004 | Agrawal et al. |
| 2005/0018683 A1 | 1/2005 | Zhao et al. |
| 2005/0033741 A1 | 2/2005 | Dombroski et al. |
| 2006/0218176 A1 | 9/2006 | Hsu et al. |
| 2007/0136317 A1 | 6/2007 | Przywara |
| 2007/0244850 A1 | 10/2007 | Hoppe et al. |
| 2007/0245119 A1 | 10/2007 | Hoppe |
| 2008/0126706 A1 | 5/2008 | Newport et al. |
| 2008/0133583 A1 | 6/2008 | Artan et al. |
| 2008/0162402 A1 | 7/2008 | Holmes et al. |
| 2009/0006399 A1 | 1/2009 | Raman et al. |
| 2009/0024568 A1 | 1/2009 | Al-Omari et al. |
| 2009/0210445 A1 | 8/2009 | Draese et al. |
| 2009/0222659 A1 | 9/2009 | Miyabayashi et al. |
| 2010/0088309 A1 | 4/2010 | Petculescu et al. |
| 2010/0114868 A1 | 5/2010 | Beavin et al. |
| 2010/0131540 A1 | 5/2010 | Xu |
| 2010/0223253 A1 | 9/2010 | Gopal et al. |
| 2011/0060876 A1 | 3/2011 | Liu |
| 2011/0066593 A1 | 3/2011 | Ahluwalia et al. |
| 2011/0078134 A1 | 3/2011 | Bendel et al. |
| 2011/0283082 A1 | 11/2011 | McKenney et al. |
| 2012/0011108 A1 | 1/2012 | Bensberg et al. |
| 2012/0011133 A1 | 1/2012 | Faerber et al. |
| 2012/0011144 A1 | 1/2012 | Transier et al. |
| 2012/0036134 A1 | 2/2012 | Malakhov |
| 2012/0117055 A1 | 5/2012 | Al-omari et al. |
| 2012/0136846 A1 | 5/2012 | Song et al. |
| 2012/0136889 A1 | 5/2012 | Jagannathan et al. |
| 2012/0143877 A1 | 6/2012 | Kumar et al. |
| 2012/0158729 A1 | 6/2012 | Mital et al. |
| 2012/0166400 A1 | 6/2012 | Sinclair et al. |
| 2012/0173517 A1 | 7/2012 | Lang et al. |
| 2012/0260349 A1 | 10/2012 | Nagai et al. |
| 2012/0303633 A1 | 11/2012 | He et al. |
| 2012/0310917 A1 | 12/2012 | Sheinin et al. |
| 2013/0138628 A1 | 5/2013 | Bensberg et al. |
| 2013/0218934 A1 | 8/2013 | Lin et al. |
| 2014/0006379 A1 | 1/2014 | Arndt et al. |
| 2014/0025648 A1 | 1/2014 | Corbett et al. |
| 2014/0074819 A1 | 3/2014 | Idicula et al. |
| 2014/0108489 A1 | 4/2014 | Glines et al. |
| 2014/0129568 A1 | 5/2014 | Kim et al. |
| 2014/0214794 A1 | 7/2014 | Attaluri et al. |
| 2014/0214795 A1 | 7/2014 | Attaluri et al. |
| 2014/0214855 A1 | 7/2014 | Attaluri et al. |
| 2014/0215019 A1 | 7/2014 | Ahrens |
| 2014/0337375 A1 | 11/2014 | Yue |
| 2014/0372388 A1 | 12/2014 | Attaluri et al. |
| 2014/0372407 A1 | 12/2014 | Attaluri |
| 2015/0154218 A1 | 6/2015 | Attaluri |

OTHER PUBLICATIONS

Hua, Nan, et al., "Rank-Indexed Hashing: A Compact Construction of Bloom Filters and Variants", IEEE, 2008, pp. 73-82.

Xu, Yang, "A Multi-Dimesional Progressive Perfect Hashing for High Speed String Matching", 2011 Seventh ACM/IEEE Symposium on Architectures for Networking and Communications Systems, pp. 167-177.

U.S. Appl. No. 14/509,336, "Embracing and Exploiting Data Skew During a Join or Groupby", filed Oct. 8, 2014, 38 pages.

Chang, Shih-Fu; "Recent Advances of Compact Hashing for Large-Scale Visual Search", Columbia University, Oct. 2012, pp. 1-44.

* cited by examiner

REDUCING COLLISIONS WITHIN A HASH TABLE

CROSS-REFERENCE TO RELATED APPLICATIONS

This application is a continuation of U.S. patent application Ser. No. 13/753,769, entitled "REDUCING COLLISIONS WITHIN A HASH TABLE" and filed Jan. 30, 2013, the disclosure of which is incorporated herein by reference in its entirety.

BACKGROUND

1. Technical Field

Present invention embodiments relate to hash tables, and more specifically, to improving performance of hash tables by reducing hash collisions.

2. Discussion of the Related Art

A hash table in the computer science realm is a data structure that uses a hash function to map identifying values, referred to as keys, to associated values. For example, a key can be a person's name that maps to that person's telephone number (the associated value). To accomplish this mapping, a hash table utilizes an associative array, whereby the hash function is used to transform the key into an index, called the hash, of an array element where the corresponding value is to be sought. The array element where the corresponding value is to be sought is also referred to as a slot or bucket. Each bucket can hold several items, whereby the number of buckets is typically chosen so that dividing a hash code by the number of buckets returns an acceptable distribution of "good" hashes.

Optimally, a hash function should map each possible key to a unique slot index, so as to reduce the possible of hash collisions. However, this is rarely achievable in practice, since new entries may be entered into the hash table after it is created, thereby resulting in the possibility of a hash collision due to different keys mapping to the same hash value and thus the same bucket.

BRIEF SUMMARY

According to one embodiment of the present invention, a computer-implemented method of reducing collisions in hash tables includes: starting with an original sparsely populated hash table that has reduced collisions, removing each empty bucket from a hash table and compacting the non-empty buckets; generating a map of the hash table indicating a status of the buckets of the hash table; and accessing data in the hash table by applying a hash key to the generated map to determine a corresponding non-empty bucket containing the data. Embodiments of the present invention further include a program product and apparatus for reducing collisions in hash tables in substantially the same manner described above.

DETAILED DESCRIPTION

Figure 1:
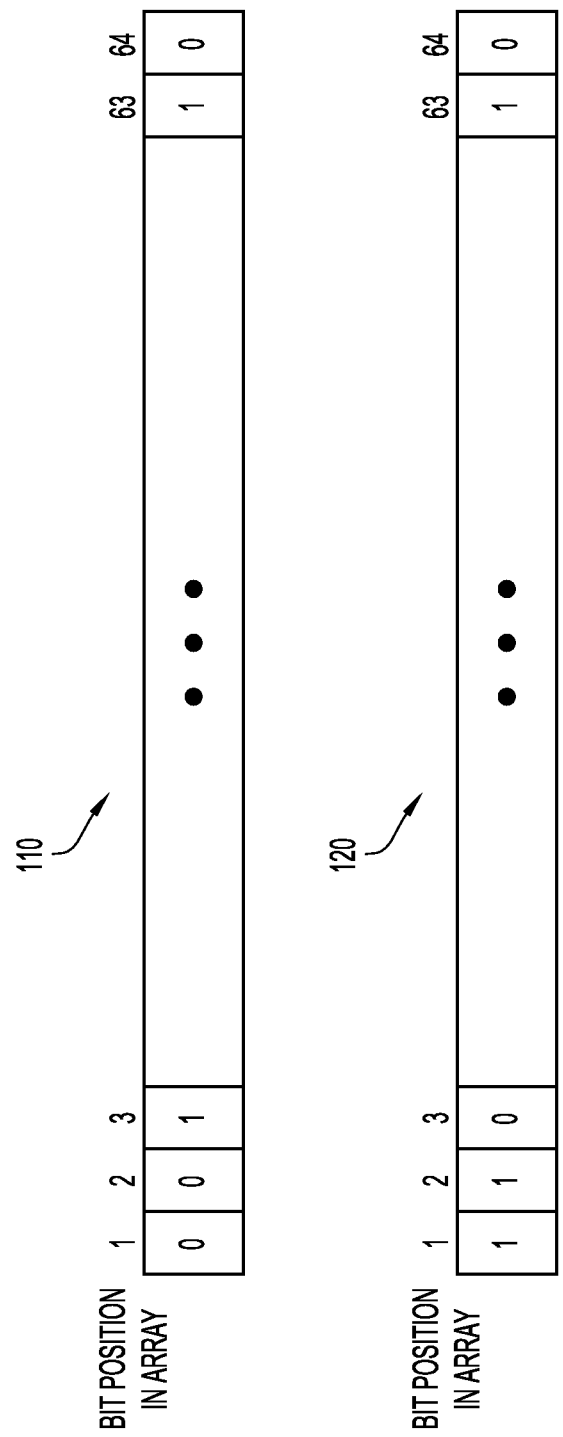
FIG. 1 shows an implementation of a bitmap array that may be utilized in present invention embodiments.

Present invention embodiments operate to reduce hash collisions in a hash table to improve the performance of the hash table. Hash collisions are practically unavoidable when hashing a random subset of a large set of possible keys. By way of example, if 1000 keys are hashed into 100,000 buckets, there is a small but not insignificant chance that at least two of the keys are hashed to the same slot or bucket even assuming a uniform random distribution, thereby resulting in a hash collision. As such, collision reduction is an important part of hash table design.

Conventionally, there is a tradeoff between hash table fill factor (also referred to in the art as "load factor") and hash collision rate. Typically, hash tables are not filled beyond about 50-60% because collision rates go up dramatically with fills beyond this amount. By having a fill rate below 50%-60%, the hash table will take up more space, and will fit lower in the cache hierarchy (e.g., as a Level 2 or Level 3 cache instead of as a Level 1 cache) and become slower to access, due to the lesser likelihood of getting a "hit" in the hash table because of the lesser number of entries in the hash table.

One conventional way to deal with this conundrum is to use closed addressing, also referred to as "chaining." In chaining, each slot of the bucket array in the hash table is a pointer to a linked list that contains the key-value pairs that hash to the same location. Lookup requires scanning the linked list for an entry with the given key. Insertion of an entry requires adding a new entry record to either end of the linked list belonging to the hashed slot. Deletion requires searching the linked list and removing the element to be deleted. Chained hash tables with linked lists are popular because they require only basic data structures with simple algorithms to implement, and can use simple hash functions that are unsuitable for other methods.

However, chaining has two drawbacks: 1) it introduces an extra pointer per element, thereby using up more space, and 2) walking along the chain often results in random memory accesses (whereas open addressing involves sequential memory accesses, which are faster). Another alternative is called "cuckoo hashing," which achieves higher fill factors but requires random access to two buckets for each lookup, thereby effectively doubling the number of random accesses to the hash table.

Present invention embodiments conceptually (i.e., not physically) form an uncompacted hash table with very low fill factor, such as 25%, whereby with such a low fill factor, three out of every four buckets are empty (the fill factor refers to the fraction of buckets that are occupied). At this low fill factor, hash collisions are negligible. Then, in order to save space, the hash table is compacted and all empty buckets are eliminated. To mark which buckets are eliminated, a separate bitmap array is maintained (the bitmap array is sized to the full uncompacted hash table size), whereby a one-entry ("1") in the bitmap array corresponds to an occupied bucket, and whereby a zero-entry ("0") in the bitmap array corresponds to an unoccupied or empty bucket. The bitmap array may be implemented as an array of n-bit numbers (n being a positive integer multiple of two, for example), such as 64-bit numbers, in which there is one bitmap array entry for every 64 buckets of the uncompacted hash table.

Present invention embodiments can also reduce cache misses by partitioning hash table joins to plural agents based on join column value frequency and their respective hash value.

FIG. 1 shows an implementation of a bitmap array that may be utilized in present invention embodiments. The bitmap array includes a first 64-bit bitmap entry 110 associated with the first 64 buckets in the hash table (e.g., buckets 1-64), and a second 64-bit bitmap entry 120 associated with the next 64 buckets (e.g., buckets 65-128) in the hash table, etc. The first bitmap array entry 110 indicates that bucket 1 and bucket 2 are empty, bucket 3 is occupied, . . . , bucket 63 is occupied, and bucket 64 is empty. The second bitmap array entry 120 indicates that bucket 65 (bucket 1 in this bitmap entry) is occupied, bucket 66 (bucket 2 in this bitmap entry) is occupied, bucket 67 (bucket 3 in this bitmap entry) is empty, . . . , bucket 127 is occupied, and bucket 128 is empty.

Figure 2:
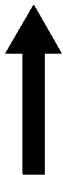
FIG. 2 shows a hash table that is compacted to obtain a compacted hash table and a bitmap array according to present invention embodiments.

Reference is now made to FIG. 2, which shows a hash table 200 that can be compacted by the procedure above to arrive at a compacted hash table 210, and whereby a bitmap array 220 for the uncompacted hash table 200 is also shown. In more detail, the hash table 200 originally had four (4) unoccupied buckets and five (5) occupied buckets (with corresponding keys K1-K5 and pointers p1-p5) out of nine (9) buckets in total, resulting in a 5/9 fill factor. After compaction is performed, the compacted hash table 210 has five (5) occupied buckets, along with the array of bitmaps 220 for the nine buckets of the original non-compacted hash table 200.

When a lookup for a key to the hash table is desired, linear probing can be performed only in the bitmap array 220, which is much smaller in size than the hash table 200 and can easily fit into a Level 1 (L1) cache for fast searching. Next, a population count can be performed in the bitmap array 220 to find the range of buckets to look at in the compacted hash table 210.

By creating a compacted hash table, memory space can be freed up due to the smaller size required for the compacted hash table and bitmap array as compared to the uncompacted hash table. This freed up memory space can be used for other applications, thereby lessening the amount of memory space required by a system.

Figure 3:
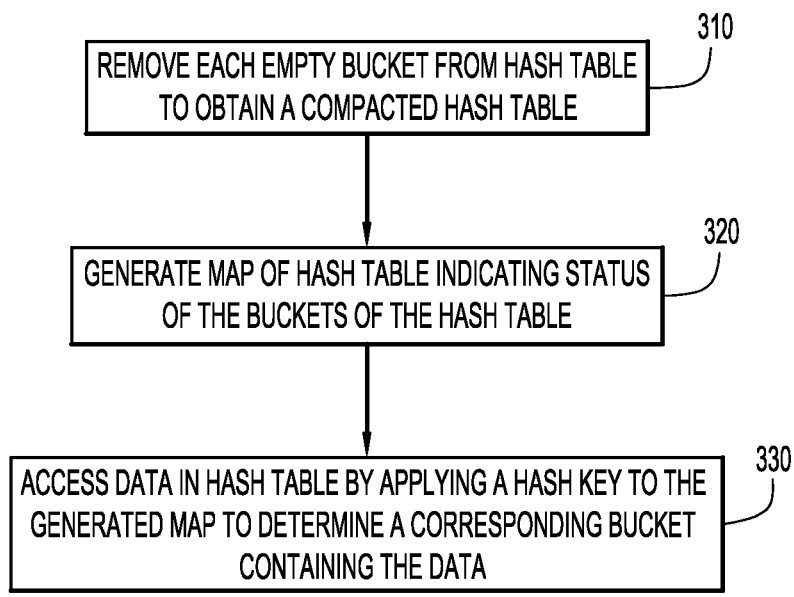
FIG. 3 is a flow diagram of a method of improving performance of an open addressing hash table according to present invention embodiments.

FIG. 3 is a flow diagram of a method of improving performance of an open addressing hash table by compacting the hash table according to present invention embodiments. In step 310, each empty bucket from a hash table is removed and the non-empty buckets remaining in the hash table are thereby compacted. In step 320, a map of the hash table is generated, indicating a status of the buckets of the hash table. In step 330, data in the hash table is accessed by applying a hash key to the generated map to determine a corresponding bucket containing the data.

Figure 4:
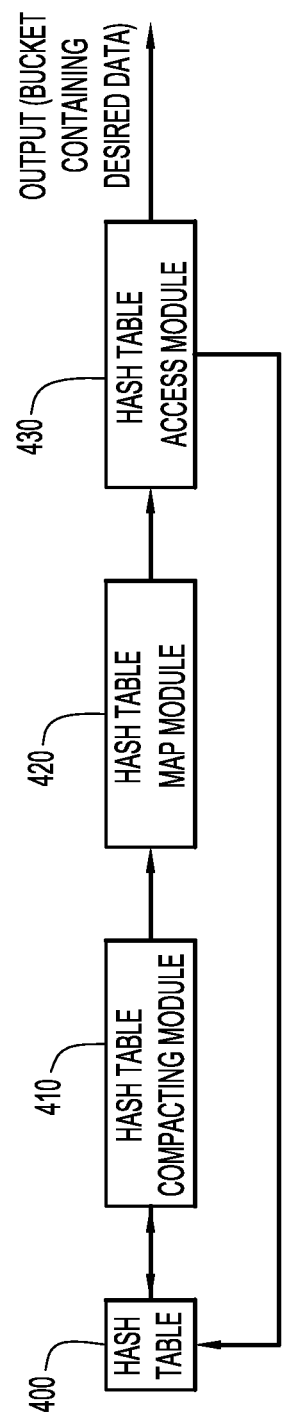
FIG. 4 is a block diagram of an apparatus for improving the performance of an open addressing hash table according to present invention embodiments.
Figure 10:
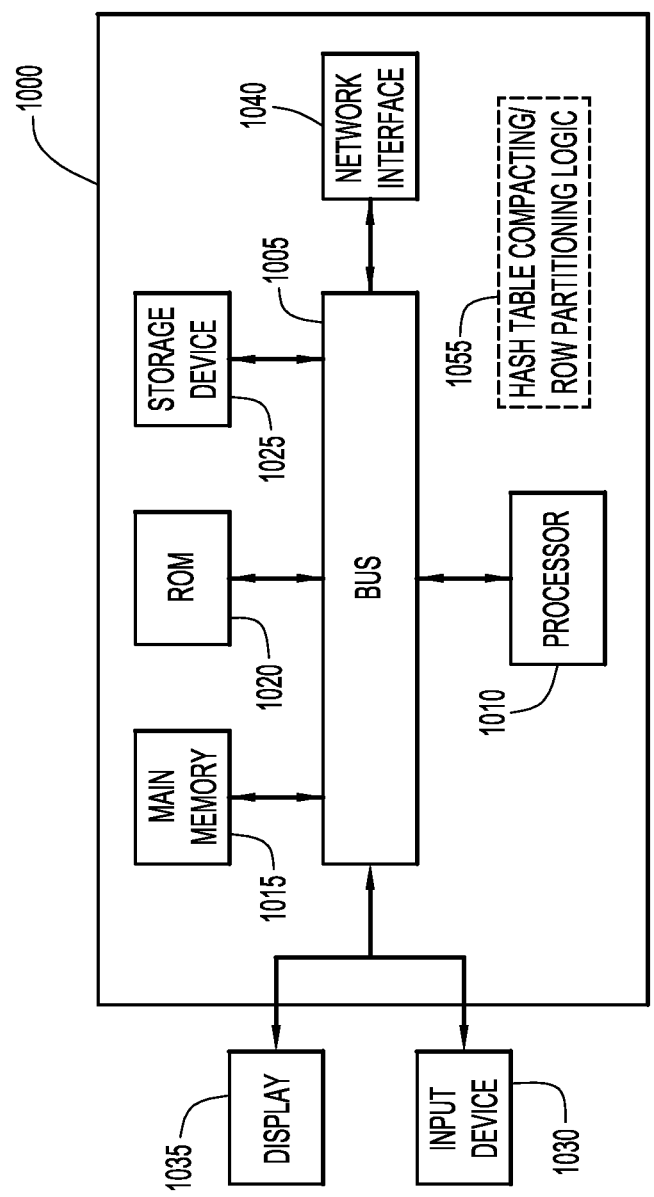
FIG. 10 illustrates a depiction of a computing system that can perform hash table compacting and that can perform partitioning of hash table joins according to present invention embodiments.

FIG. 4 is a block diagram of an apparatus for improving the performance of an open addressing hash table by compacting the hash table according to present invention embodiments. A hash table compacting module 410 removes each empty bucket from a hash table 400 and compacts the non-empty buckets. A hash table map module 420 generates a map of the hash table indicating a status of the buckets of the hash table. A hash table access module 430 accesses the hash table by applying a hash key to the generated map output by the hash table map module 420 to determine a corresponding bucket in the hash table 400 containing the data. With reference also to FIG. 10, the hash table compacting module 410, the hash table map module 420, and the hash table access module 430 may be implemented by the processor 1010, whereby a hash table map may be stored in the main memory 1015 or the storage device 1025 for access by the processor 1010 when executing computer program product.

Pseudo-code for performing the population count in accordance with present invention embodiments is provided below.

```
lookup(key, hashTable, bitmap) {
    bkt ← hash(key) % hash table size;
    // finds a range of bits bitmap[bkt, end) such that;
    //    all the bits bitmap[bkt], bitmap[bkt+1], ... bitmap[end-1] are
    set to 1,
    //       bitmap[end] is set to 0 (or end >= size of bitmap)
    // Note that if bitmap[bkt]==0, end is set to bkt
    end ← findRangeOf1Bits(bitmap, bkt);
    if (end<=bkt) return no match found,
    // Finds the number of bits set to 1 in bitmap[0..bkt]
    startHTindex ← prefixPopulationCount(bitmap, bkt);
    Lookup for key in range of hashTable buckets
        [startHTIndex, startHTIndex+end-bkt-1];
},
``` where findRangeOf1Bits( ) is a simple bitmap operation that can optionally use hardware instructions for computing the count of leading ones in a 64-bit number (most computer platforms have such a leading zeros instruction). The variable prefixPopulationCount( ) can be large, and so a precomputed population count may be maintained at 64-bit boundaries. In more detail, the variable prefixPopulationCount( ) uses the precomputed( ) count and adds the population count in the last partial word (via the leading zeros instruction). This results in a 32-bit count maintained once for every 64 entries, whereby this procedure increases the size of the bitmap by 50%. This is much smaller than what is saved by achieving a 100% fill factor. In one possible implementation, the 32-bit count is co-located with the corresponding 64 bits of the bitmap, so that both are likely to fall into the same machine cache line and thus can be accessed with no additional random memory accesses. Other boundaries may be envisioned while remaining within the spirit and scope of the embodiments described herein. For example, a count may be maintained for every 32 entries or for every 16 entries in alternative implementations.

In the above pseudo-code implementation, a preliminary bit map is built using the hash keys without actually populating any table. This enables the computation of the compacted hash table's size, and the building of a population count array. The unsorted hash keys are run through, and their insertion into the uncompacted hash table is simulated. A preliminary bit map entry "i" is set when the current hash key hashes to the uncompacted hash table bucket "i". Only the hash keys are read at this step, and the preliminary bit map is updated accordingly. When a hash key hashes to the uncompacted hash table bucket "j" and the bit "j" is already set, then the collision is handled by simulating linear hashing by iterating for an "unset" bit in the bit map and setting it when found. The population count array is then created by scanning the preliminary bit map and creating the population count array. Then, the actual bit map and the compacted hash table are created. This can be done by scanning uncompacted hash keys in the same order as before, whereby the bit map is set in the same way as the preliminary bit map. The difference is that the compacted hash table is populated in this step by computing its index from the population count array and the preliminary bit map. After this is performed, the preliminary bit map can be freed for use.

Consider an example in which the hash table key and payload take up 50 bytes/entry. The number of desired entries in the hash table is usually rounded up to the nearest power of 2 (e.g., even if an application desires a table with say 650 entries, it will get a table with 1024 entries). In practice, hash tables are typically only 50-60% filled to reduce the possibility of hash collisions. At 50 bytes/entry, for a 33% filled hash table, this results in a 100 byte overhead per entry in the hash table. In contrast, present invention embodiments involve just a 1.5 bit/entry bitmap, corresponding to one bit for the bitmap and 0.5 bits for the population count.

The uncompacted hash table (e.g., the hash table 200 in FIG. 2) can be large in some instances, and so it may fall into a lower level of the cache-memory hierarchy (e.g., level 2 or level 3 cache). Usually, the build side of a hash join is much smaller than the probe side of a hash join, and so this is typically not an issue to be concerned with. When this is not the case, such as when the hash table build time is significant, or when the memory consumption for the uncompacted hash table is prohibitive, an optimization may be performed in present invention embodiments that avoids constructing the uncompacted hash table and that directly builds the compacted hash table.

The optimization can be performed as follows. Given a set of keys and payloads, that set is sorted by the function hash (key). The sorted result is directly placed in an array, which forms the compacted hash table. The bitmap array is formed by simulating a hash table insertion algorithm of open addressing on the hash-sorted keys, without actually inserting those keys or payloads into any hash table, but by simply marking the bits in the bitmap array, so as to conceptually fill the buckets of the conceptual uncompacted hash table.

In cases where there are multiple collisions towards the end of the hash table, there may be provided extra bits beyond the hash table size (e.g., in the bitmap array), and so an allocation of more than the number of bits needed for the bitmap array can be made in present invention embodiments to provide for these extra bits and thus to reduce the number of collisions at the end of the hash table. For example, an allocation of twice the number of bits needed for the bitmap array can be made in present invention embodiments. These extra bits can be subsequently reused in present invention embodiments to hold the prefix population counts after the bitmap array is fully populated, so as to obtain a dual usage of these extra bits.

Present invention embodiments also can be used to cut down the number of hash key comparisons when a hash collision happens. Hash collision is an important performance issue, since it slows up the data retrieval process. Each hash collision adds significant cost in time and processing resources used, particularly if the join key is too big to use integer comparison (e.g., it requires the more expensive and time consuming memory comparison). Typically, when a collision happens in linear hashing, the memory comparison is repeated for each subsequent bucket in the hash table until a match occurs or an empty bucket is found in the hash table. The majority of these memory comparisons are wasteful because the data stored in the buckets being compared may have a different hash value. These wasteful memory comparisons can be reduced in present invention embodiments by attaching an attribute (e.g., a column) to the hash bucket, whereby the attribute indicates the hash value for the bucket.

Figure 5:
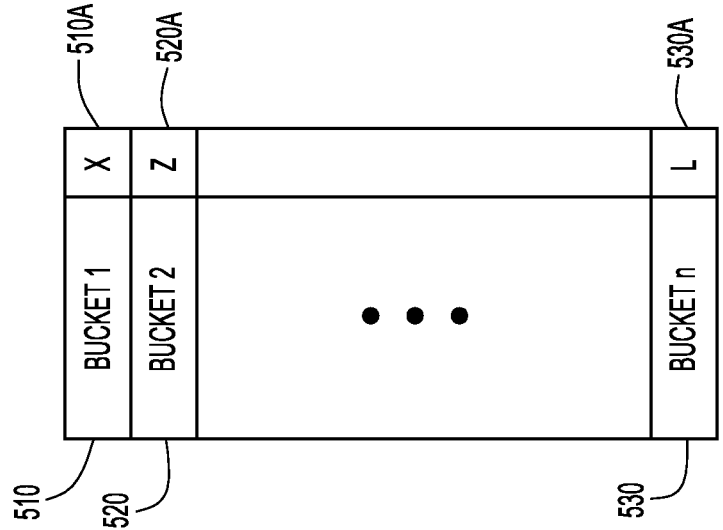
FIG. 5 shows hash buckets each with its own attribute provided as a separate column to the hash bucket according to present invention embodiments.

FIG. 5 shows one possible implementation of hash buckets provided with attribute data, whereby the hash buckets are provided within a hash table according to present invention embodiments. In particular, FIG. 5 shows hash buckets 510, 520, . . . , 530, each with its own attribute 510A, 520A, . . . , 530A provided as a separate column to the hash buckets. This addition of an attribute to the bucket avoids having to do expensive memory comparisons (in a time sense) when the bucket hash value does not match that of the key being looked up.

Alternatively, a bucket attribute can be added in the hash table that points to (or gives the index of) the next bucket hosting a key with the same hash value, which also avoids wasteful memory comparisons. This indexing of buckets that host a key with the same hash value allows for only the buckets that match a particular key to be processed in the hash table.

Figure 6:
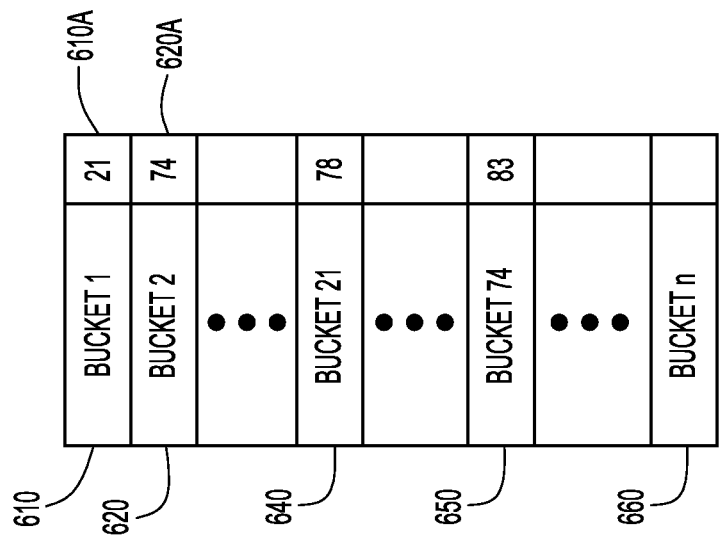
FIG. 6 shows hash buckets having pointers that point to the next bucket entry that hosts a key with the same hash value according to present invention embodiments.

FIG. 6 shows another possible implementation of hash buckets provided with pointers, whereby the hash buckets are provided within a hash table according to present invention embodiments. In more detail, FIG. 6 shows a first bucket 610 having a pointer 610A as an additional column to that bucket entry, in which the pointer 610A points to the next bucket entry 640 (bucket 21) that hosts a key with the same hash value as the first bucket 610. A second bucket 620 has a pointer 620A as an additional column to the bucket entry, in which the pointer 620A points to the next bucket entry 650 (bucket 74) that hosts a key with the same hash value as the second bucket 620. The nth bucket 660, which is the last bucket in the hash table, does not have a pointer associated with it, and so it does not point to another bucket that hosts a key with the same hash value as that bucket.

Present invention embodiments can also resolve issues related to open hashing, also referred to above as "chaining", which may result in wasted memory when the hashed data (including payload) is large. With open hashing, memory is wasted by the unused buckets that exist in a partially filled hash table. This situation gets worse as the load factor increases.

However, a large load factor may cause too many collisions. Present invention embodiments operate to resolve this issue by not embedding the hashed data in the hash table bucket, but instead storing the data separately, whereby a pointer to the separately-stored data is stored in the hash bucket. The pointer (or offset) may be an absolute address or an index into an array structure in order to save memory space. Also, de-referencing the pointer/offset does not cause a cache fault if the entire hash table is able to fit in a cache (e.g., a level 1 cache). When the hashed data is large, this approach allows the increase of the hash table fill factor regardless of the size of the hashed data, without suffering a higher hash collision rate.

Figure 7:
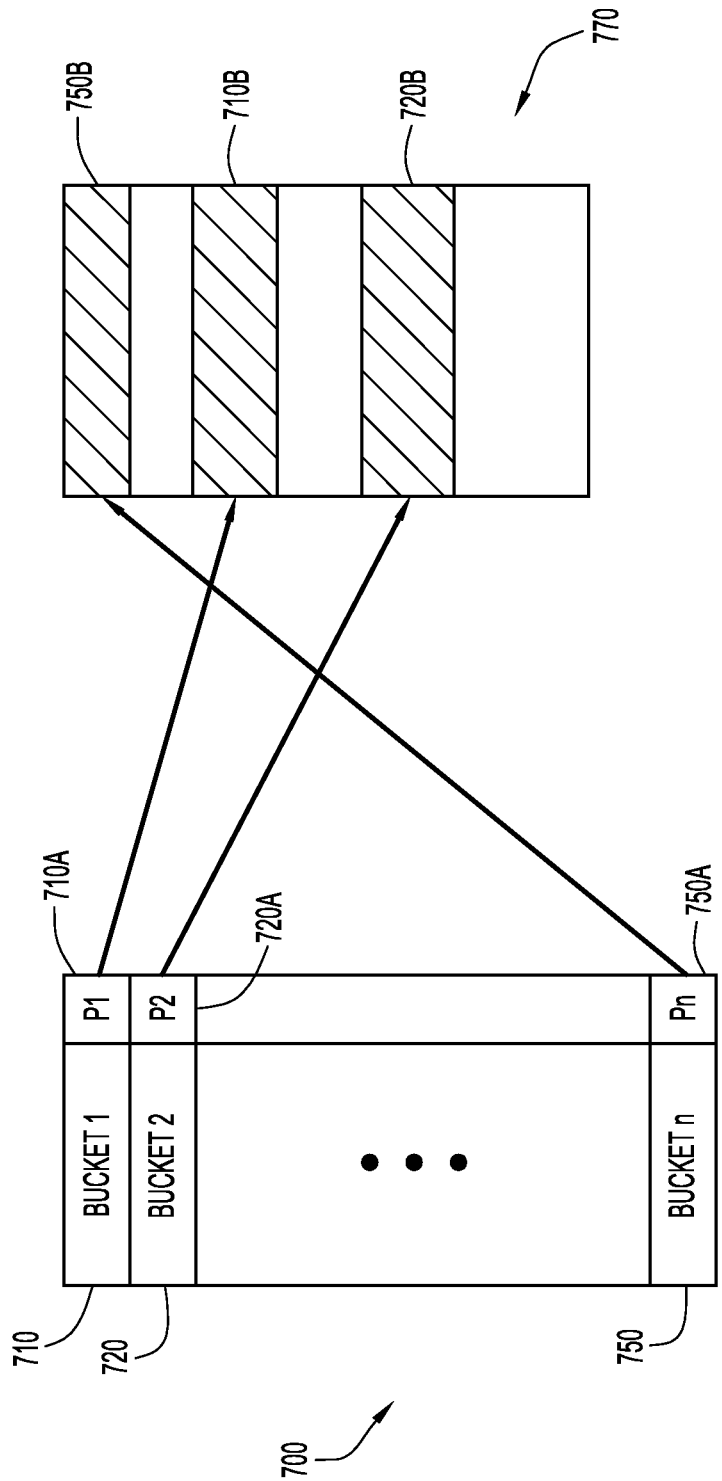
FIG. 7 shows hash buckets having pointers that point to other storage elements that store payloads associated with the hash buckets according to present invention embodiments.

FIG. 7 shows an implementation of the above embodiment, in which a hash table includes buckets with pointers to a separate storage where additional data is stored. In more detail, FIG. 7 shows a hash table 700 having buckets 710, 720, . . . , 750, whereby each bucket has a pointer (column) P1 710A, P2 720A, . . . , Pn 750A that points to a memory location in a separate storage 770 that stores the hashed data payloads 710B, 720B, . . . , 750B associated with the buckets. Arrows are shown that provide the pointers from the respective buckets 710A, 720A, . . . , 750A in the hash table 700 to their respective payloads 710B, 720B, . . . , 750B in the separate storage 770.

Present invention embodiments can also minimize collisions and lookups for hash keys that occur frequently in an outer leg of a hash table. A typical design of a hash table does not recognize that the frequency of join column values in the outer table can vary. Such a design limitation hurts the performance of hash table lookups because a collision involving a frequent join column value is quite hurtful in terms of data access and retrieval (that is, the hash look up cost in time lost and processing resources utilized due to the collision is multiplied by the frequency of the foreign key). In more detail, during a hash join, a hash table is built using the join column values of the inner leg (say Table B), and this hash table is probed for each outer leg row (say Table A) to create the join output. This probe can be inefficient if the hash table is larger and does not fit in a processor's cache (i.e., level 1 cache). To avoid this inefficiency, the inner leg's data can be partitioned into several smaller (and mutually exclusive) hash tables, whereby each of these hash tables are small enough to fit in the processor's cache. After the hash table is built, each agent (or software thread) fetches a set of rows from the outer leg and their join column values are probed in the hash table to perform the join. The hash table probe and join phases can be improved by partitioning the outer leg rows and by grouping the hash table lookups for a single hash table. This way, the agent loads the hash table into a processor's cache once, and looks it up repeatedly. Otherwise, the hash table has to be loaded and unloaded from the processor's cache multiple times, which is undesirable from a processing time perspective.

One problem with such a parallel hash table partitioning scheme as described above is that the same hash table may be accessed by multiple agents (and processors) at the same time, and as a result the hash table creates processor contention and gets transferred between different processors several times, resulting in cache misses. This limitation can be addressed in present invention embodiments by reducing cache misses for frequently occurring join column values as follows. When a hash table is built for the inner leg, the frequent join column values of the outer leg are inserted first, as join column values that are encoded with few bits. The infrequent join column values are then inserted last. As a result, during hash look up, the frequent join column values are likely not to experience any cache misses, thereby reducing the overall cost of hash lookup.

A dynamic optimization can also dynamically be performed in present invention embodiments during the 'probe' phase (the phase when lookups into the hash table are being performed), by tracking lookup frequency and periodically reorganizing the hash table. Reorganization may involve reinserting values into a new copy of the hash table, in order of decreasing lookup frequency.

Partitioning the rows of a hash table can be performed based on a simple hash value of the join columns and their frequency. Typically, the rows are partitioned using a simple hash of the join column values, and a separate hash table is built for each partition. Such a design involves several assumptions: (1) all partitions contain approximately the same number of input rows; (2) the hash table for each partition fits the processor's cache; and (3) the same load factor may be used for all hash tables because cache misses are equally bad for any partition.

However, since cache misses cause more cost and time consumption for frequently occurring join column values, one possible way to decrease cache misses is to increase the load factor for a hash table with frequent join column values, and to reduce the load factor for a hash table with infrequent join column values (whereby the total memory used for the hash tables remains the same). However, the join column value frequency would not be considered for changing the load factor of a hash table if the rows are partitioned by using just the hash value.

Accordingly, present invention embodiments address this problem by partitioning using both the join column value frequency and their hash value. For example, the join column values can be divided into several sets based on their frequency. Each set can be further divided using the hash value. That way, the join column value frequency would be considered for changing the load factor of a hash table even if the rows are partitioned by using just the hash value. Further, a bigger load factor can be used for the sets of frequent join column values, to increase hash table access efficiency.

According to some present invention embodiments to reduce the frequency of cache misses, an agent partitions the inner leg's rows of a hash table into multiple small hash tables instead of a single hash table, such that each hash table can fit into a processor's cache. The partitioning can be determined, for example, by a simple and efficient hash-like-function on the joining columns of the inner leg. To join the outer leg with the inner leg, each agent fetches a set of rows from the outer leg (table), and partitions each outer leg row using the hash-like-function (the same function that was used on the join columns of the inner leg to partition the inner leg rows into multiple hash tables) on the outer leg's joining columns. This partitioning determines the hash table to be probed for that particular outer leg row. After this partitioning, the agent performs all the probes/joins for a particular hash table before moving on to the next hash table. This scheme increases the cache locality because the agent avoids memory random access due to having to access a single large hash table that does not fit in the processor's cache.

The above scheme improves cache locality, but increases processor cache contention when the same hash table is probed by multiple agents/processors. To reduce this contention, the agents can be formed into one or more exclusive groups when they need to probe the inner leg's hash tables to join a set of outer leg rows. Work can be pooled and shared among a group of agents such that a single hash table is less likely to be probed by multiple agents/processors at the same time.

The agent groups can be created and managed as follows. The system is started with zero groups. When an agent obtains a set of outer leg rows to process, it checks if an "open" group exists. If no open group exists, the agent creates a new group in the "open" state and adds itself to this new group. A group is considered "open" if its members (agents) are not finalized, and work has not distributed to those members yet. If an open group already exists, the agent adds itself to that open group. After adding itself to a group, the agent proceeds to partition its input (outer leg rows) to determine the target hash table for each input row. It then pools this input into the total work for its group. The agent then waits for all other member agents to partition their input and add their work to the group.

When all the agents have partitioned their input and added their work to the group, the group becomes "closed" and no new members are allowed to join the group. The pooled work is then distributed to the member agents to minimize processor cache contention. This step is a sync-point for the group members because a member cannot start the join work on the outer leg rows until the group is closed and the group's input rows are known.

A free agent is assigned all the input rows that are needed to probe a particular hash table. The agent is responsible for probing that hash table and joining the assigned input rows. When this assignment is completed, the agent becomes free and can request new work.

If an agent is free but no new work is available (i.e., because the work has been assigned to other members and is being processed), that agent waits for all other members in the group to finish.

When all the agents become free (i.e., all the input rows are processed), the members exit the group, and the group is terminated. This step is also a sync-point for the group members because the members cannot exit the group and perform other work on their next set of outer leg rows until they exit the group.

Additional constraints can be added to provide for optimal hash table access. One constraint that may be added is that an agent cannot join a group if its input is too small. If the agent has very few input rows, the agent can process that input quickly by itself, and does so. The overhead of joining a group and pooling the work may not be justified in this case.

Another constraint that may be added is that an agent may be allowed to exit a group before it is closed if the group is too small to justify the overhead of pooling work. This allows a small group to be disbanded because the members may be able to process their individual input more efficiently, without the group overhead (the two sync-points described above and other overhead).

Yet another constraint that may be added is that a group may not be closed immediately after all the members have partitioned and added their input to the group. Instead, the group may be kept open for a certain time period if it is too small (not enough members joined) to allow more members to join the group. This constraint achieves more efficient hash table accessing since a bigger group facilitates more effective pooling of work. Also, a bigger group minimizes the number of groups, which is important because groups contend with each other when they probe the same hash table.

Figure 8:
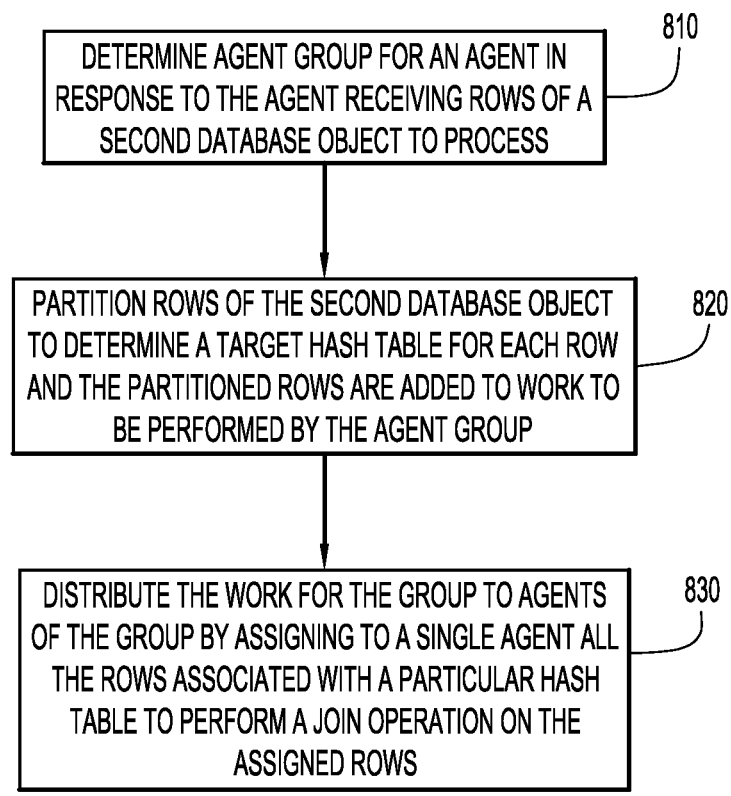
FIG. 8 illustrates a flow diagram for performing partitioned join operations between a first database object and a second database object according to the present invention embodiments.

FIG. 8 illustrates a flow diagram for performing partitioned join operations between a first database object and a second database object with the present invention embodiments described above. In step 810, an agent group for an agent is determined in response to the agent receiving rows of the second database object to process. In step 820, the rows of the second database object are partitioned to determine a target hash table for each row and the partitioned rows are added to work to be performed by the agent group. In step 830, the work for the group is distributed to agents of the group by assigning to a single agent all the rows associated with a particular hash table to perform a join operation on the assigned rows.

Figure 9:
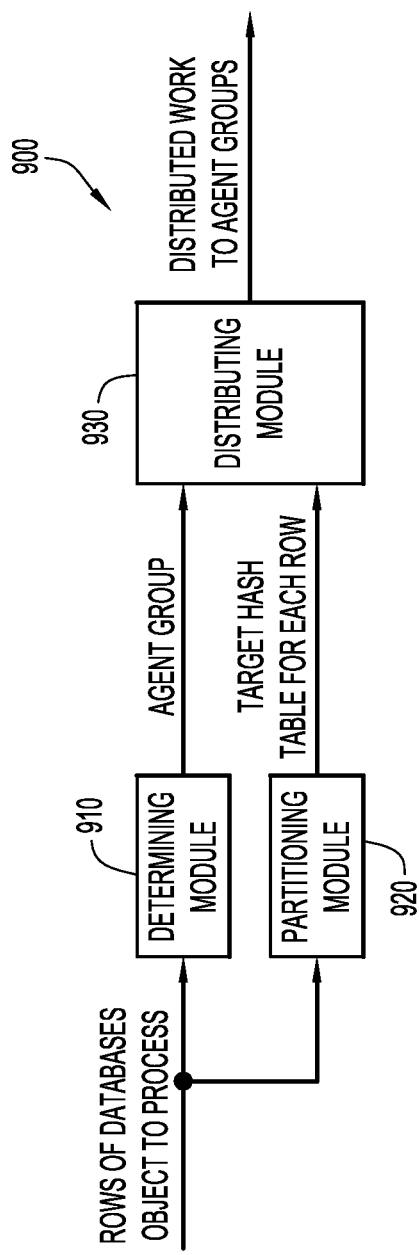
FIG. 9 illustrates a block diagram of an apparatus that performs partitioned join operations between a first database object and a second database object according to the present invention embodiments.

FIG. 9 illustrates an apparatus 900 for performing partitioned join operations between a first database object and a second database object. The apparatus 900 includes a determining module 910 that determines an agent group for an agent in response to the agent receiving rows of the second database object to process. The apparatus 900 also includes a partitioning module 920 that partitions the rows to determine a target hash table for each row and adding the partitioned rows to work to be performed by the agent group. The apparatus further includes a distributing module 930 that distributes the work for the group to agents of the group by assigning to a single agent in the group all the rows associated with a particular hash table to perform a join operation on the assigned rows (and by assigning to another agent in the same group all the rows associated with another hash table to perform a join operation on the assigned rows, etc.). With reference also to FIG. 10, the determining module 910, the partitioning module 920, and the distributing module may be performed by one or more of the processor 1010, the bus 1005, and the network interface 1040.

As described above, the parallel hash table partitioning scheme has some drawbacks with respect to cache misses. Present invention embodiments overcome these drawbacks by having the agents pool their work so that each partition (hash table) is processed by a single agent at any given time, thereby resulting in reduced cache misses. When the agent finishes processing the hash table, it picks up the next available hash table to process, whereby the agents continue to work in parallel until all of the hash tables are searched. The agents can be assigned to different groups in the manner as described earlier with respect to a present invention embodiment, whereby agents in each group pool their work to obtain "group work", and whereby the agents perform the group work such that no agent in the same group accesses the same hash table as another agent in the same group at the same time.

Additionally, a data skew problem may exist in which an outer leg row maps to the same hash table and whereby the same hash table needs to be probed by an agent. This data skew problem can be resolved in present invention embodiments by allowing the same hash table to be probed by multiple agents and by dividing the work along input boundaries. That is, the input from an agent (the outer leg rows scanned by that agent for probing against the hash table) is given to one of the agents, and the input from a single agent to probe a particular hash table is not distributed amongst multiple agents. Accordingly, data copy is minimized and cache locality is improved (e.g., less cache misses).

In some present invention embodiments, partitioning is used as a way to improve the cache and memory efficiency of joins. In these present invention embodiments, both the inner and outer side of a equijoin (i.e., a join that combines records from two or more tables) are partitioned using the leading (MSB) bits of a hash value computed on a key (e.g., a concatenated key), so that the join can be performed within each partition alone. Each of the partitions, being smaller than the entire table, are more likely to fit in a level one cache (or fit in memory, for spilling joins). This may provide significant performance gains because joins within each partition involve random accesses (for hash table lookups), and the cost of random accesses goes up sharply as one accesses higher levels of the memory hierarchy (e.g., level two or level three caches).

In an explicit synchronization scheme, when performing a join, the inner table (which may be the smaller table) is partitioned completely. The outer table is scanned, partitioned, and joined in a pipelined fashion. At any time, a batch (also referred to as a join-stride) of outer tuples are scanned, and their concatenated foreign keys are partitioned, and then each partition is joined with the corresponding (already-built) partitioned hash table of the inner table.

Effectively, this results in the entire inner table getting accessed (in random access fashion), once per batch of the outer table. In terms of memory access, the memory bandwidth that is consumed in this process can be determined by the following equation:

$$|inner|*|outer|/|join\ stride|$$

Based on the above equation, large join stride sizes are better for join performance. Ideally, the join stride size should be proportional to the size of the inner table (since making it any larger is not beneficial because then the memory bandwidth consumption is dominated by the scans of the inner and outer tables). The working memory consumption of a join evaluator can be computed as follows: (number of threads) *|join stride|.

Accordingly, if the join stride size is made as large as the inner table size, then the join memory consumption may become prohibitive on multicore machines. A multi-threaded cache optimization can be performed to achieve good join performance at moderate join stride sizes. This can be achieved by considering the join stride of tuples being processed by all threads as a consolidated whole when performing probes into the inner table. Ideally, outer tuples for a single partition from all threads are collected, that single partition's hash table is loaded into cache (e.g., level 1 cache), and then the join is performed. However, an explicit synchronization scheme as this entails may be too expensive because the cost of synchronization may negate the performance gains from improved cache efficiency.

To reduce the negative effect caused by explicit synchronization, in present invention embodiments a light synchronization is performed instead of an explicit synchronization. In more detail, when a thread enters a join evaluator (i.e., it has scanned a join stride worth of outer foreign keys and is ready to do the join), it registers itself in a global task queue and is provided a new task id, which may correspond in some implementations to a counter value that increments automatically.

For cache efficiency, each thread tries to perform joins for a partition, not just for the outer tuples that it scans, but for outer tuples from other threads as well. Specifically, each thread performs joins for a partition for all the outer tuples from all tasks in a contiguous range of task ids. After getting a task id, a thread partitions its foreign keys and goes sequentially through each partition, checking to see if joins need to be performed for the foreign keys in that partition. This check is performed because the joins for a partition could be done either by this thread or another thread. To detect if joins have already been performed for a partition, two global counters can be maintained for each partition, as provided below:

lastInProcTaskId: An atomic counter indicating the inclusive upper bound of a task-id range that is most recently assigned to a thread for processing. In some implementations, the tasks can be assigned to a single thread at any point.

maxProcTaskId: A non-atomic counter that indicates the highest task id that has been processed (for which join has been completed).

As an example that utilizes the two counters described above, consider a case in which a thread has partitioned its outer table into five (5) partitions. In this example, the thread's task id is 89. When it scans through the first partition, it notices that the global task id counter is at 90, and the first partition's lastInProcTaskId is only at 75. Thus, this thread performs the joins for the range of tasks (75, 90]. Then on the second partition, this thread finds the second partition's lastInProcTaskId is already at 95, which means some other thread has already taken on the job of performing joins for this partition. As such, this thread immediately moves on to the third partition. There, it finds lastInProcTaskId is only 88, and so this thread's task id of 89 is not covered. The global task id counter is at 103, so this thread performs joins for the range (88, 103), which includes the thread's task id of 0.89 as well as other task ids. This process then continues until all partitions are handled.

In accordance with some present invention embodiments, when a thread is assigned a task-id range for a partition, it performs joins for all tasks up to and including the highest task id in that range. This assignment happens when a thread goes through each partition and checks if its (the thread's) task id is smaller than the lastInProcTaskId for that partition. If so, another thread has already been assigned the job of performing the join for this thread's task for this partition. If not, this thread is assigned the job of performing the join for this partition's task up to the highest task-id currently. This assignment can be implemented in the form of atomic compare and swap operations on this partition's counters. As such, a light synchronization scheme involving only an atomic compare-and-swap per partition is performed in these present invention embodiments.

A thread can exit the join evaluator only after joins have been performed for all the outer tuples in its (non-empty) partitions. To check this, a flag is maintained for each partition for each thread. This flag can be turned off initially, and then is turned on by the thread that performs the join, after the join is complete for a partition. A thread also may take some precautions even if it needs to exit because of an exception. These precautions may cost CPU cycles, but are useful to avoid memory access or corruption problems. In any case, exceptions should be rare in the middle of a join, so this cost should rarely be incurred. A thread may take these precautions by executing the following steps before it exits due to an exception:

a) It marks all its tasks (corresponding to different partitions) as completed (sets the flag referred above);
b) It iterates through each partition, making sure that this thread's task is in a "safe state" to exit:
  i) If the maximum task id currently being processed for this partition is less than this thread's task id, then it is safe to exit because every other agent would notice its tasks are already completed,
  ii) If the maximum completed task id for this partition is greater than this thread's task id, then this thread's task for this partition is already processed. As a result, this thread's task is safe to exit.

In some implementations, each thread may scan through the list of partitions in round-robin fashion to look for join work to perform. Initially, each thread starts out from a staggered position, i.e., thread j starts at position j*Number of Partitions/Number of threads, so that the threads do not repeatedly run into each other. With this scheme, if the threads are running at roughly the same speed, each thread performs joins on a distinct range of partition numbers (e.g., no join overlap amongst threads), thereby improving efficiency.

In the case of skew, some partitions may have a lot more work (more tasks) to process than others. For cache efficiency, each thread may be configured to pick up the partition with the largest number of pending tasks, so that the cost of fetching the inner hash table into cache is amortized among largest number of outers. A simple 'least recently used' (LRU) heuristic may be used to simulate this scheme, in which each thread repeatedly picks the partition that was least recently joined. That way, the partition is likely to have the largest range of tasks to process.

When a thread is scanning through the partitions to check if any joins need to be performed, a spin-looping situation may occur in which excessive CPU resources are spent just for checking if the partition has join work to do. To overcome this potential spin-looping situation, the CPU may be periodically yielded after a specific number of iterations during this process.

Some present invention embodiments provide for optimized partitioned join operability when the inner leg hash tables are non-trivial in size. If they are very small, the overhead may dominate the benefits of this embodiment. In general, partitioned joins themselves are an overhead for small hash tables, so partitioning may be disabled for small hash tables in some implementations.

Additionally, the overhead of the synchronization may be still significant when the join stride size is very small, e.g., 32,768 tuples or less. As such, the partitioning may be disabled in some present invention embodiments when the join stride size is below a predetermined threshold.

FIG. 10 illustrates a depiction of a computing system 1000 that can improve performance of a hash table according to the embodiments described above. The computing system 1000 includes a bus 1005 or other communication mechanism for communicating information and a processor 1010 coupled to the bus 1005 for processing information. The computing system 1000 also includes main memory 1015, such as a random access memory (RAM) or other dynamic storage device, coupled to the bus 1005 for storing information, and instructions to be executed by the processor 1010. Turning now to FIGS. 4-7, the hash table compacting module 410, the hash table map module 420 and the hash table access module 430 shown in FIG. 4 may be implemented by way of the processor 1010, whereby the hash table and hash table map module may be stored in the main memory 1015 or in the storage device 1025, for example. Also, the hash tables shown in FIGS. 5-7 may be stored in the main memory 1015 or in the storage device 1025. Main memory 1015 can also be used for storing position information, temporary variables, or other intermediate information during execution of instructions by the processor 1010. The computing system 1000 may further include a read only memory (ROM) 1020 or other static storage device coupled to the bus 1005 for storing static information and instructions for the processor 1010. A storage device 1025, such as a solid state device, magnetic disk or optical disk, is coupled to the bus 1005 for persistently storing information and instructions. Network interface 1040 provides a connection to a network, such as the Internet or a Local Area Network (LAN) or a Wide Area Network (WAN). Hash table compacting/Row partitioning logic 1055, which may be stored in main memory 1015, ROM 1020 and/or storage device 1025, and which also may include some hardware logic components as well as the modules shown in FIG. 4 and FIG. 9, is utilized by processor 1010 to perform the hash table compacting and the row partitioning and joins as described above with respect to various embodiments.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

It will be appreciated that the embodiments described above and illustrated in the drawings represent only a few of the many ways of implementing embodiments for hash table compacting and partitioning hash table joins. For example, compacting of a hash table can be made such that the hash table can compacted to the extent that it can function as a level 1 cache, in which the hash table still may include empty entries, while remaining within the spirit and scope of the invention (and in which the bitmap array is modified accordingly). Also, the pooling of resources to different agents in a group of agents in order to reduce cache misses can be made in a different manner than described earlier (e.g., based on outer leg rows or inner leg rows, or both), while remaining within the spirit and scope of the invention.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop compatible, laptop, PDA, mobile devices, etc.), and may include any commercially available operating system and any combination of commercially available and custom software (e.g., browser software, communications software, server software, hash table compacting software, hash table mapping software, hash table accessing software, join partitioning software, work distributing software, etc.). These systems may include any types of monitors and input devices (e.g., keyboard, mouse, voice recognition, etc.) to enter and/or view information.

It is to be understood that the software of the present invention embodiments (e.g., the modules shown in FIG. 4 and FIG. 9) may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., hash tables, bitmap arrays, partitioned joins, etc.). The database system may be implemented by any number of any conventional or other databases, data stores or storage structures (e.g., files, databases, data structures, data or other repositories, etc.) to store information (e.g., hash tables, bitmap arrays, partitioned joins, etc.). The database system may be included within or coupled to the server and/or client systems. The database systems and/or storage structures may be remote from or local to the computer or other processing systems, and may store any desired data (e.g., hash tables, bitmap arrays, partitioned joins, etc.). Further, the various tables (e.g., hash tables, compacted hash tables, bitmap arrays, etc.) may be implemented by any conventional or other data structures (e.g., files, arrays, lists, stacks, queues, etc.) to store information, and may be stored in any desired storage unit (e.g., database, data or other repositories, etc.).

The present invention embodiments are not limited to the specific tasks or algorithms described above, but may be utilized for improving the performance of hash tables other than open addressing hash tables.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a tangible (non-transitory) computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of reducing collisions in hash tables, comprising:
   removing each empty bucket from a hash table and compacting the non-empty buckets;
   generating a map of the hash table indicating a status of the buckets of the hash table; and
   accessing data in the hash table by applying a hash key to the generated map to determine a corresponding bucket containing the data, wherein accessing further comprises:
      applying the hash key to the generated map to determine a corresponding position in the generated map;
      computing a population count in the generated map, according to all positions in the generated map up to the determined corresponding position; and
      using the computed population count as a bucket position of the corresponding bucket containing the data.

2. The computer-implemented method according to claim 1, further comprising:
   precomputing a prefix population count at particular boundaries in the generated map.

3. The computer-implemented method according to claim 2, wherein each prefix population count is stored collocated with corresponding entries of the generated map.

4. The computer-implemented method according to claim 1, wherein the hash table is stored as an open addressed hash table having multiple keys that hash to a same initial location in the hash table.

5. The computer-implemented method according to claim 1, wherein each bucket present in the hash table includes an attribute indicating one of a corresponding hash value and a pointer to a next bucket for the same hash value.

6. The computer-implemented method according to claim 1, wherein values that are likely to be frequently looked up are inserted within the hash table prior to values that are likely to be infrequently looked up in the hash table.

7. The computer-implemented method according to claim 6, wherein the hash table is utilized for a join operation for data within a first database object and a second database object, and a frequency of lookup is estimated according to the frequency of the values in the second database object.

8. The computer-implemented method according to claim 6, wherein the hash table is used for performing an aggregation and grouping of data within a single database object, and wherein a frequency of lookup is estimated according to frequency of grouping values within the single database object.

9. The computer-implemented method according to claim 1, wherein the hash table is utilized for a join operation for data within a first database table and a second database table, and wherein the method further comprises:
   partitioning rows of the first database table based on frequencies and hash values of values to be joined and generating a hash table for each partition.

10. The computer-implemented method according to claim 1, wherein payload data of the hash table is stored separately from the hash table and the buckets of the hash table include pointers to the payload data for the hash table.

11. A computer-implemented method of reducing collisions in hash tables, comprising:
   removing each empty bucket from a hash table and compacting the non-empty buckets;
   generating a map of the hash table indicating a status of the buckets of the hash table; and
   accessing data in the hash table by applying a hash key to the generated map to determine a corresponding bucket containing the data, wherein each bucket present in the hash table includes an attribute indicating one of a corresponding hash value and a pointer to a next bucket for the same hash value.

12. The computer-implemented method according to claim 11, wherein accessing further comprises:
   applying the hash key to the generated map to determine a corresponding position in the generated map;
   computing a population count in the generated map, according to all positions in the generated map up to the determined corresponding position; and
   using the computed population count as a bucket position of the corresponding bucket containing the data.

13. The computer-implemented method according to claim 12, further comprising:
   precomputing a prefix population count at particular boundaries in the generated map.

14. The computer-implemented method according to claim 13, wherein each prefix population count is stored collocated with corresponding entries of the generated map.

15. The computer-implemented method according to claim 11, wherein the hash table is stored as an open addressed hash table having multiple keys that hash to a same initial location in the hash table.

16. The computer-implemented method according to claim 11, wherein values that are likely to be frequently looked up are inserted within the hash table prior to values that are likely to be infrequently looked up in the hash table.

17. The computer-implemented method according to claim 16, wherein the hash table is utilized for a join operation for data within a first database object and a second database object, and a frequency of lookup is estimated according to the frequency of the values in the second database object.

18. The computer-implemented method according to claim 16, wherein the hash table is used for performing an aggregation and grouping of data within a single database object, and wherein a frequency of lookup is estimated according to frequency of grouping values within the single database object.

19. The computer-implemented method according to claim 11, wherein the hash table is utilized for a join operation for data within a first database table and a second database table, and wherein the method further comprises:
  partitioning rows of the first database table based on frequencies and hash values of values to be joined and generating a hash table for each partition.

20. The computer-implemented method according to claim 11, wherein payload data of the hash table is stored separately from the hash table and the buckets of the hash table include pointers to the payload data for the hash table.

\* \* \* \* \*